UNITED STATES PATENT OFFICE

GEORGE W. HERSEY, OF GREENBUSH, WISCONSIN.

IMPROVED PROCESS FOR TANNING.

Specification forming part of Letters Patent No. 58,643, dated October 9, 1866.

*To all whom it may concern:*

Be it known that I, GEORGE W. HERSEY, of Greenbush, Sheboygan county, and State of Wisconsin, have invented a new and Improved Process for Preparing and Tanning Hides and Skins; and I do hereby declare that the following is a full, clear, and exact description thereof, which will enable others skilled in the art to make and use the same.

This invention relates to a new and improved process for preparing and tanning hides or skins, with or without the hair, whereby a soft and pliable leather is produced in a comparatively short time and with little labor.

The first operation to which I subject the hides or skins, previous to liming, is to soak them in a solution of common salt in water; and if the hides are hard and the hair to come off I add a certain quantity of soft soap, the salt-water and soap being mixed in about the following proportion: water, four gallons; salt, one pint; and, when soft-soap is used, soft-soap, one pint.

For liming I use one quart of slaked lime and the same of ashes for every four gallons of water, adding lime and water according to the number of hides or skins.

For bating I use a mixture made of bran, water, and sour milk in about the following proportion: water, four gallons; bran, one peck; sour milk, four quarts, the milk being added to cause fermentation and to neutralize the lime.

For tanning with the hair off I use a liquor made of a solution of terra-japonica, Glauber salt, sulphuric acid, and common salt, which ingredients are mixed together in about the following proportion: water, four gallons; terra-japonica, one-half pound (or its equivalent in hemlock or oak liquor;) Glauber salt, two ounces; sulphuric acid, two ounces; common salt, one pint. On the third or fourth day add again one-half pound of terra-japonica, or its equivalent.

For tanning furs, robes, or sheep-skins, with the hair or wool on, I use a liquor made of water, sulphuric acid, nitric acid, borax, alum, and Glauber salt, which are mixed in about the following proportion: water, one pint; sulphuric acid, one pound; nitric acid, one ounce; borax, one ounce; alum, one ounce; Glauber salt, one ounce.

This liquor is applied to the flesh side of the skin, and the skins are then rolled up or packed flesh to flesh until tanned. By this process the tanning is effected with less liquor than in the old way, and it leaves the fur in its natural state and prevents the moths from getting in it. The liquor may be applied with a swab or brush or put on with a paste.

Previous to tanning I put the skins in a weak brine of salt water, mixed with a small quantity of sulphuric acid, for three or four hours.

For buckskin tanning I use the same liquors as for tanning other skins, adding a small quantity of ocher or other coloring-matter to the tanning-liquor.

For glove-leather I use a liquid made of one pint of soft soap, one pint of tanner's oil or neat's-foot oil, and one-half pint of oil of benzine, or one-half pint of alcohol.

For grain-slaking I use a liquor made of four ounces of terra-japonica, two ounces of the extract of logwood, one ounce of copperas, and one pint of urine.

For coloring furs I use a solution of one ounce of crystallized nitrate of silver and seven ounces of carbonate of ammonia in two pints of rain-water, to which may be added one-quarter ounce of logwood.

For stuffing leather I use a compound of two quarts of tanner's oil, two pounds of tallow, one pint of linseed-oil, and two ounces of beeswax.

For finishing I use a paste made of one-quarter pound of glue, melted in one pint of water and mixed with a compound of half a pint of tanner's-oil and half a pound of melted tallow. To this mixture I add a sufficient quantity of flour-paste to make it spread easy. By this mixture a high finish is given to the leather.

For tanning sole-leather I use terra-japonica, or its equivalent of the liquor of hemlock or oak bark, mixed with a small quantity—say half a pound to each hide—of Glauber salt and the same of common salt until the leather is half tanned. Then I put the same in another liquor made without the use of Glauber and common salt.

What I claim as new, and desire to secure by Letters Patent, is—

1. Soaking the hides or skins in salt-water mixed with soft soap previous to liming, substantially as and for the purpose described.

2. The use for tanning leather of a liquor containing Glauber salt and common salt in combination with terra-japonica, substantially as and for the purpose described.

3. Applying to the flesh the sulphuric acid, Glauber salts, and alum and borax to all furs with swab or brush or paste to the same.

GEORGE W. HERSEY.

Witnesses:
  A. M. BARNUM,
  F. D. LADENBERGER.